United States Patent [19]
Noble

[11] 3,782,259
[45] Jan. 1, 1974

[54] CAMERA

[76] Inventor: Samuel Noble, 2608 Watonga, Union Lake, Mich.

[22] Filed: Dec. 10, 1971

[21] Appl. No.: 206,032

Related U.S. Application Data

[63] Continuation-in-part of Ser. No. 801,513, Feb. 24, 1969, abandoned.

[52] U.S. Cl. ............. 95/31 R, 95/11 R, 95/31 FM, 95/31 FL, 95/DIG. 1, 95/45
[51] Int. Cl. .................... G03b 17/04, G03b 19/04
[58] Field of Search .......... 95/31 R, 31 FM, 31 FL, 95/DIG. 1, 45, 11 R, 31 CA; 74/110

[56] References Cited
UNITED STATES PATENTS

| | | | |
|---|---|---|---|
| 3,595,150 | 7/1971 | Engelsmann | 95/31 CA |
| 3,631,783 | 1/1972 | Jones | 95/31 FL |
| 3,603,232 | 9/1971 | Jones | 95/31 R |
| 3,247,773 | 4/1966 | Doblin et al. | 95/31 FM |
| 3,605,591 | 9/1971 | Rigolini et al. | 95/31 R |
| 3,648,582 | 3/1972 | Nerwin | 95/31 R |
| 3,643,577 | 2/1972 | Monachesi | 95/45 |
| 707,705 | 8/1902 | Lockwood | 74/110 |
| 3,631,786 | 1/1972 | Crapsey, Jr. | 95/45 |
| 3,498,199 | 3/1970 | Everburg | 95/31 FM |
| 3,631,782 | 1/1972 | Eagle | 95/31 R |

Primary Examiner—Samuel S. Matthews
Assistant Examiner—Russell E. Adams, Jr.
Attorney—Arthur Raisch et al.

[57] ABSTRACT

A factory-loaded film magazine and a camera is supported on the intermediate portion of the magazine between the supply chamber and take-up chamber for the film. The magazine when fitted to the camera forms a light tight enclosure. A winding knob is pivoted to the camera body and may be moved from a retracted to an extended position.

44 Claims, 34 Drawing Figures

PATENTED JAN 1 1974 3,782,259

INVENTOR.
SAMUEL NOBLE
BY
Barnes, Kisselle, Raisch & Choate
ATTORNEYS

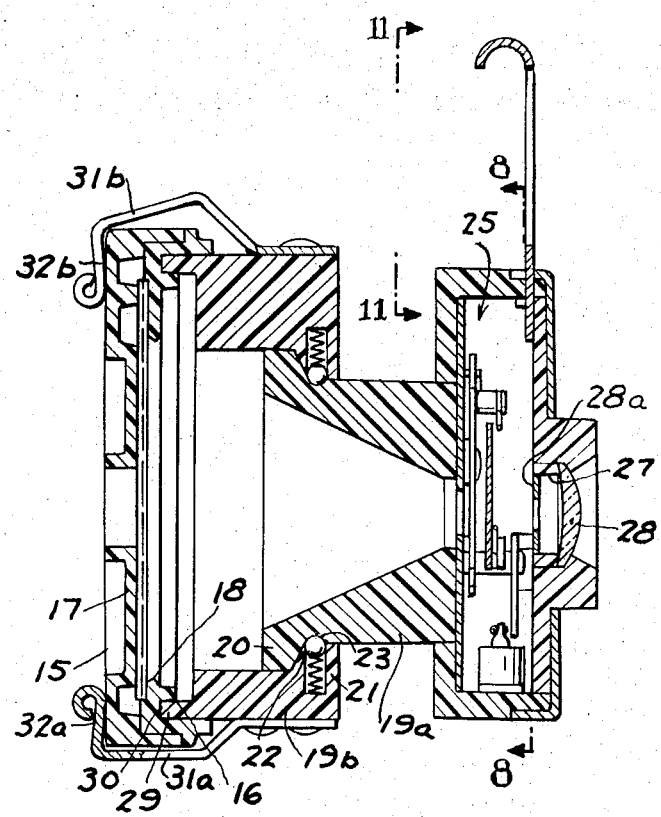
FIG. 7
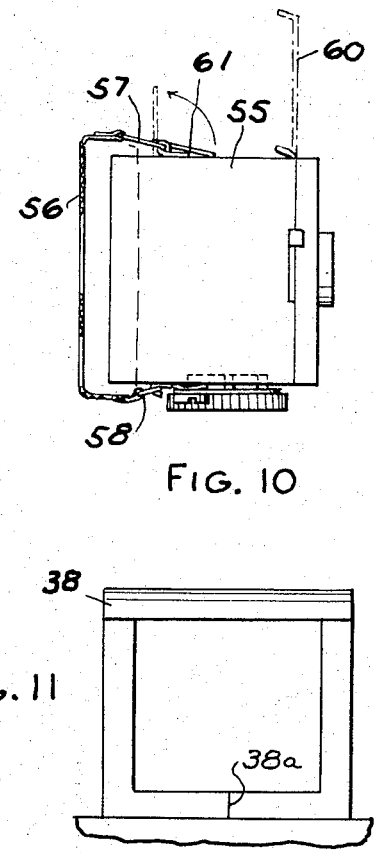
FIG. 10
FIG. 11
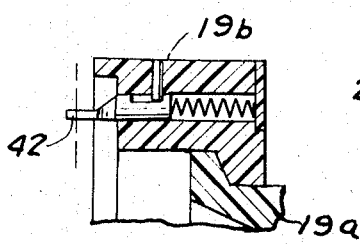
FIG. 9
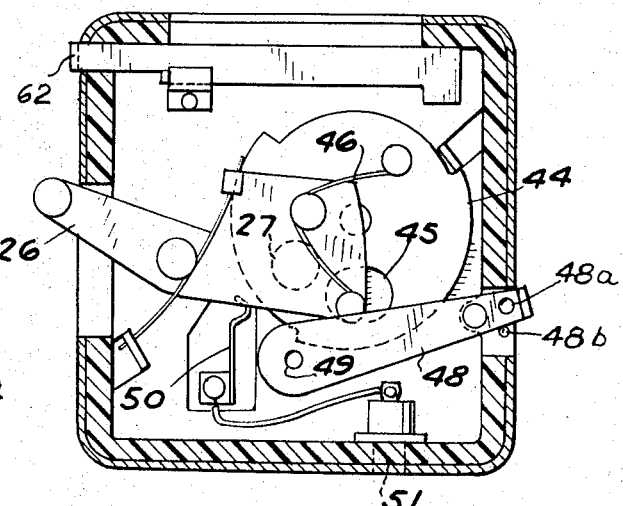
FIG. 8
INVENTOR.
SAMUEL NOBLE
BY
Barnes, Kisselle, Raisch & Choate
ATTORNEYS

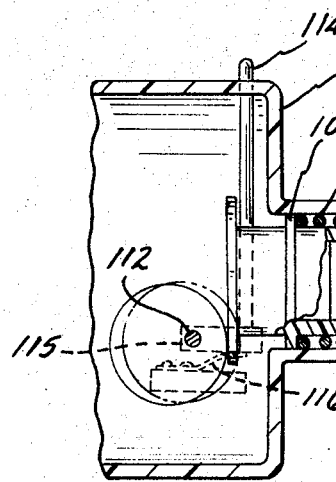
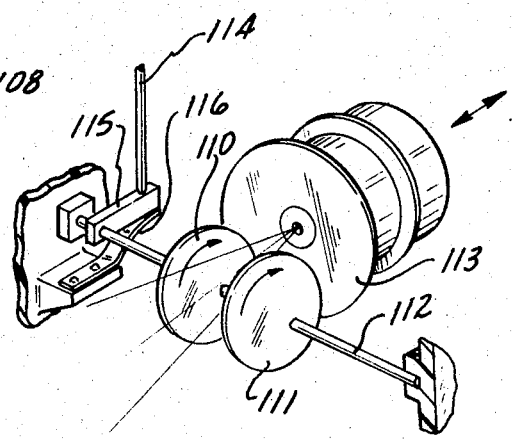
Fig-28　　　Fig-29
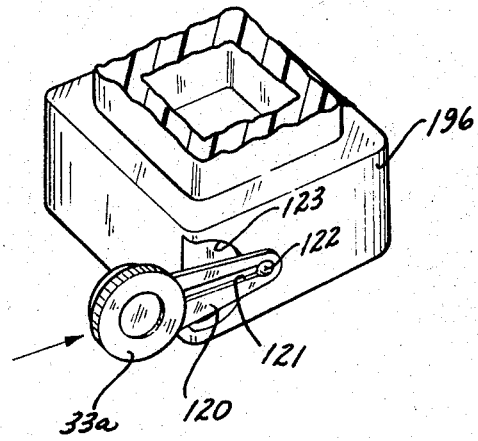
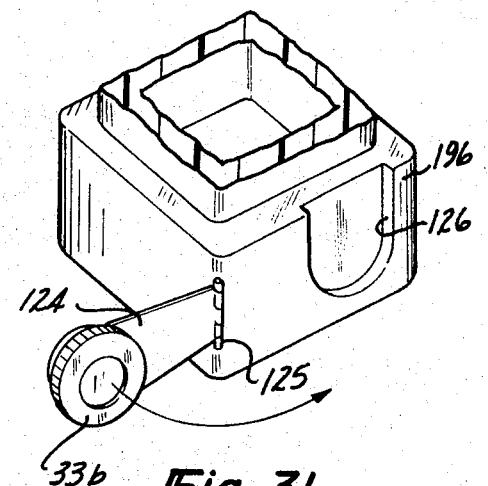
Fig-30　　　Fig-31

3,782,259

CAMERA

This application is a continuation-in-part of my co-pending U.S. Pat. application Ser. No. 801,513, filed Feb. 24, 1969 now abandoned.

This invention relates to cameras.

BACKGROUND OF THE INVENTION

In the development of small compact cameras, a major development in recent times has been the utilization of a factory-loaded film magazine in the camera such as shown in the U.S. Pat. to Nerwin U.S. Pat. No. 3,138,081, issued June 23, 1964. Such a magazine comprises a film supply chamber and a film take-up chamber connected by an intermediate portion that has an opening exposing a portion of the film.

Such film magazines are utilized with more or less conventional type cameras wherein the magazine is dropped in the camera and the back of the camera is closed to completely enclose the magazine.

Among the objects of the invention are to provide a camera which is connected to an intermediate portion of the aforementioned film magazine and which utilizes the normal light tight characteristics of the magazine to produce a light-weight camera that is only a small fraction of the size of a conventional camera that utilizes such magazines; which camera is low in cost; light in weight and can be readily inserted in the pocket or handbag; which utilizes novel means for retaining the camera on the film magazine; which has novel means for preventing double exposure; which has novel means for adjusting the focus of the camera; which has novel means for mounting the winding knob for the film; and which has novel means for supporting a flash attachment.

SUMMARY OF THE INVENTION

Bascially, the invention comprises a factory-loaded film magazine and a camera which is supported on the intermediate portion of the magazine between the supply chamber and take-up chamber for the film. The magazine and camera have interengaging means providing a light tight seal and the camera supports a knob which is moved into position with the take-up reel of the magazine.

DESCRIPTION OF THE DRAWINGS

FIG. 7 is a sectional view taken along the line 7—7 in FIG. 4.

FIG. 8 is a front view of the camera with the cover portion removed.

FIG. 9 is a fragmentary sectional view taken along the line 9—9 in FIG. 4.

FIG. 10 is a side elevational view of a modified form of camera.

FIG. 11 is a fragmentary view taken along the line 11—11 in FIG. 7.

FIG. 28 is a fragmentary longitudinal sectional view of a further modified form of the invention.

FIG. 29 is a fragmentary exploded perspective view of a form of the invention shown in FIG. 28.

FIG. 30 is a fragmentary perspective view of a further modified form of the invention.

FIG. 31 is a fragmentary perspective view of a further modified form of the invention.

DESCRIPTION

Figure 1:
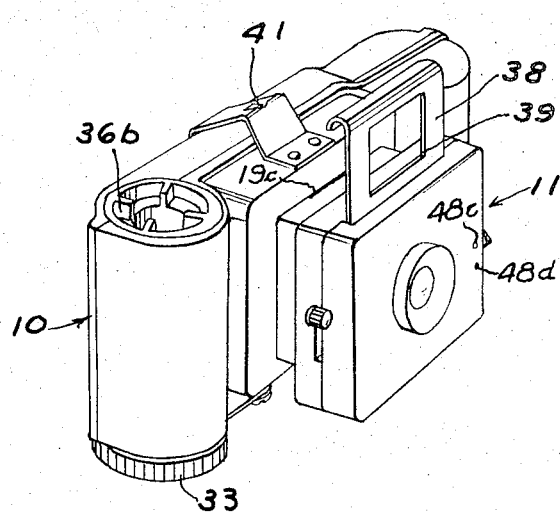
FIG. 1 is a perspective view of a camera and magazine embodying the invention.
Figure 6:
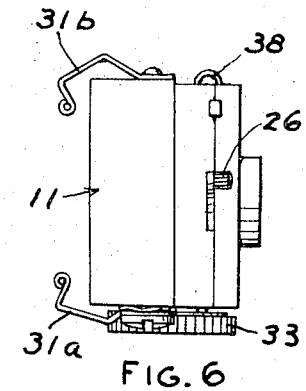
FIG. 6 is a side elevational view of the camera.
Figure 2:
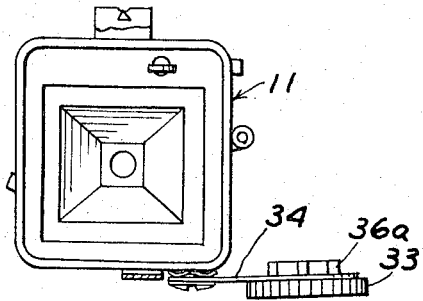
FIG. 2 is a rear view of the camera.
Figure 3:
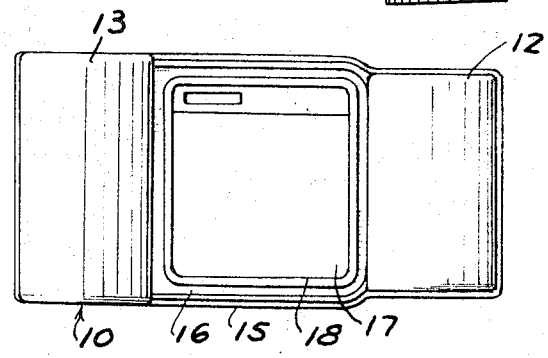
FIG. 3 is a front view of the magazine.
Figure 5:
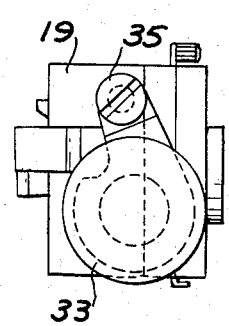
FIG. 5 is a botton view of the camera.

Referring to FIG. 3, the invention relates to the use of a film magazine 10 that is factory loaded with film and a camera 11 (FIG. 2) that is removably mounted on the film magazine (FIG. 1).

As more specifically shown in the U.S. Pat. to Nerwin No. 3,138,081, the film magazine 10 is made of plastic and comprises a supply chamber 12 for the film, a take-up chamber 13 for the film in which a take-up reel 14 is rotatably mounted and an intermediate portion 15. The intermediate portion 15 comprises a front wall 16 and a rear wall 17 spaced from the front wall 16. The front wall 16 includes an opening or aperture 18 that exposes a portion of the film F that is drawn across the space between the front and rear walls 16, 17 (FIGS. 3, 7).

As shown in FIGS. 2, 5, 6 and 7, the camera 11 comprises a camera body 19 including body portions 19a, 19b that are telescoped relative to one another and have interengaging flanges 20, 21. The flanges provide a light-tight seal and a spring-loaded detent 22 on the inner member 19b is adapted to engage a recess 23 when the members 19a and 19b are extended to indicate and hold the member 19a in the extended position. A line 19c is visible when the body portion 19a is fully extended. The member 19a has a chamber 24 in which a conventional shutter assembly 25 is positioned with a lever 26 extending externally for operating the shutter. The member 19a further includes an opening 27 in which a lens 28 is positioned. An iris 28a is provided.

The inner end of the inner member 19b is provided with a peripheral flange 29 that is adapted to extend into a groove 30 in the front wall 16 of the magazine. Spring fingers 31a, 31b having inwardly extending flanges 32a, 32b are adapted to snap over the intermediate portion 15 with the flanges 32a, 32b extending across the back or rear wall 17 to hold the camera body 19 in light-tight sealing relationship to the magazine 10.

Figure 4:
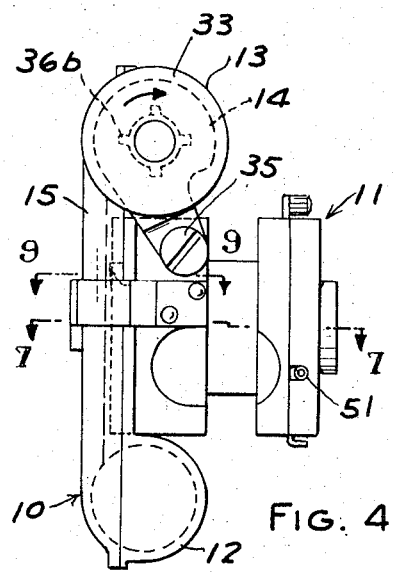
FIG. 4 is a botton plan view of the camera and magazine.

A winding knob 33 is rotatably mounted on a flat spring member or arm 34 that is pivoted to the inner member 19b by a screw 35 (FIG. 5) so that the knob 33 can be swung into overlying relationship with the teeth 36b (FIGS. 1, 4) of the take-up reel 14 to bring teeth 36a on knob 33 into engagement therewith so that the take-up reel 14 can be rotated. The force of the spring member 34 holds the teeth 36a of knob 33 in interengaging relationship with the teeth 36b.

As shown in FIGS. 1 and 7, the camera further includes a finder 38 that is slidably mounted on the body member 19a between the shutter assembly 25 and lens 28 so that it can be extended and retracted. The finder 38 includes a viewing aperture 39. One of the spring fingers 31b includes an arrow 41 that is adapted to be aligned with a line 38a on the finder for aiming the camera.

As shown in FIG. 9, the body portion 19b includes a spring-loaded finger 42 that extends toward the camera film plane and is adapted to engage notches in the film to hold the film in proper position for successive pictures. As the film is rotated by the knob 43, the finger 42 is cammed out of one notch and thereafter falls into the succeeding notch which indicates to the operator that the film has been advanced one picture or frame. A stop 42b limits outward movement of finger 42.

As shown in FIG. 8, the shutter is of conventional box camera type. The shutter assembly includes a rotatably mounted shutter 44 having an aperture 45. The shutter is normally yieldingly urged to a closed position by a spring 46 extending between the shutter and one end of the lever 26. When the lever 26 is operated, it momentarily rotates the shutter to bring the aperture 45 into alignment with the lens opening 27. An aperture lever 48 can be provided having a smaller aperture opening 49 that can be brought into alignment with the opening 27 for limiting the aperture size thereby producing some degree of flexibility. Detent 48a on level 49 is adapted to selectively engage recesses 48b on the camera, hold lever 49 and, in turn, opening 49 into or out of alignment with opening 27. When in alignment, the amount of light permitted to pass is restricted, which setting can be used for black and white film. When out of alignment, the light is unrestricted, which setting can be used for color film. Red and black dots, 48C, 48d, respectively, are provided on the exterior of the camera (FIG. 1) to indicate visually the setting of lever 48. In addition, the shutter assembly includes an electrical contact 50 extending to a socket 51 for attachment of a flashgun if desired. A reciprocable lever 62 is provided and is operable to hold the shutter in open position for time exposure in accordance with conventional shutter practice.

In the form of the invention shown in FIG. 10, the camera body 55 is shown as in a one piece housing containing the shutter assembly and lens as in the previous form of the invention. In this form, the camera is retained on the cartridge by a plastic band 56 extending between loops 57, 58 which are hinged on the top and bottom of the camera body. The finger 60 is extendable from the camera body as in the previous form of the invention and a hinged rear finger 61 is hinged to the top of the body for swinging movement to an upright position and has an opening through which the opening in the finger 60 can be viewed.

It can thus be seen that there has been provided a camera that is compact, can be easily placed in the pocket or handbag, and readily attached to a conventional cartridge to produce an overall assembly that is small and easy to handle.

Although a simple lens and shutter system has been shown and described, more accurate lenses and high speed shutters can be used.

Figure 12:
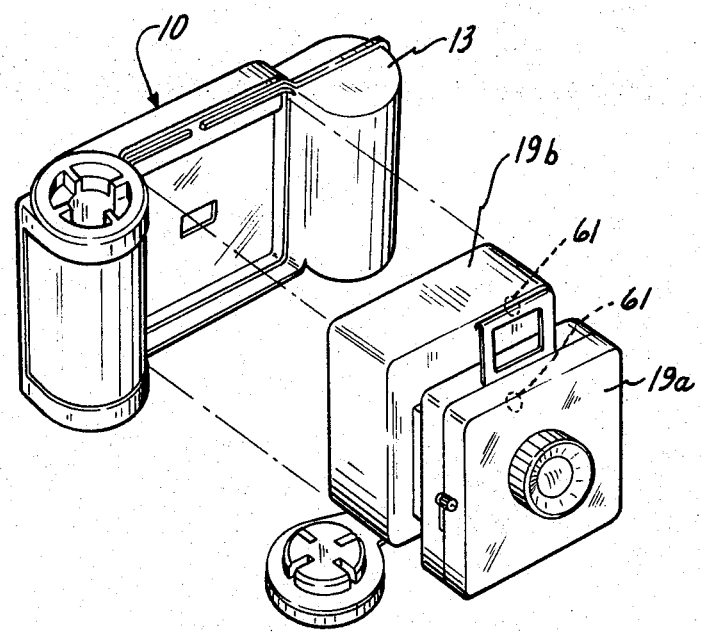
FIG. 12 is a perspective view of a modified form of the invention.
Figure 13:
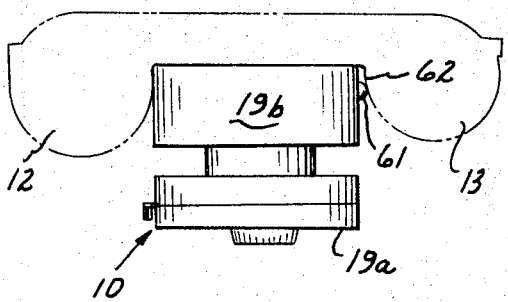
FIG. 13 is a plan view of the same.

Referring to FIGS. 12 and 13, instead of utilizing the spring fingers 31a, 31b (FIG. 6) or the plastic band 56 (FIG. 10) for holding the camera body on the film magazine, the body portion 19b of the camera is formed with projections or protuberances 61 in the form of steel balls press fitted in openings in the side of portion 19b and adapted to engage the flat surface 62 of the chambers 13. It has been found that when the camera is inserted in proper position with the intermediate plane of the magazine, the protuberances 61 frictionally engage the flat surface 62 and hold the camera firmly in proper position. The protuberances 61 engage the chamber 13 which has lesser rigidity with respect to intermediate portion 15 so that it can flex slightly relative thereto. In order to remove the magazine from the camera, the magazine being made of plastic material, is flexed by grasping the portions 12, 13 in separate hands and twisting the axis of one portion 12, 13 with respect to the other. This releases the frictional engagement of the protuberances 61.

Figure 14:
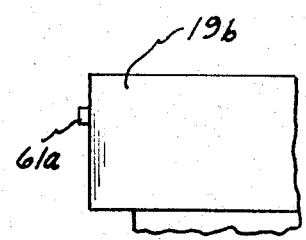
FIG. 14 is a fragmentary plan view of a modified form of the invention.
Figure 15:
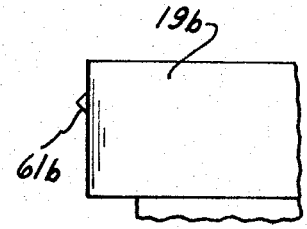
FIG. 15 is a fragmentary plan view of a further modified form of the invention.
Figure 16:
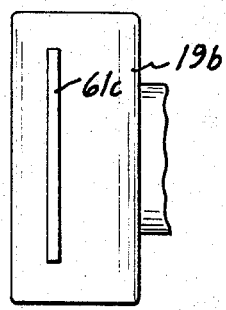
FIG. 16 is an end view of a further modified form of the invention.
Figure 17:
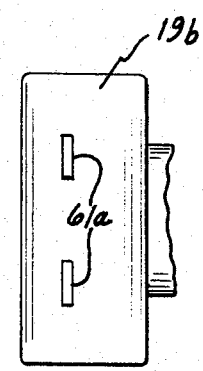
FIG. 17 is a fragmentary end view of a further modified form of the invention.

As shown in FIGS. 14 and 15, the protuberances may be made integral with body portion 19b and may take various configurations as rectangular as at 61a or triangular as at 61b. Further, the protuberances may comprise a longitudinally extending rib as at 61c in FIG. 16 or a longitudinally spaced aligned rib 61d in FIG. 17.

Figure 18:
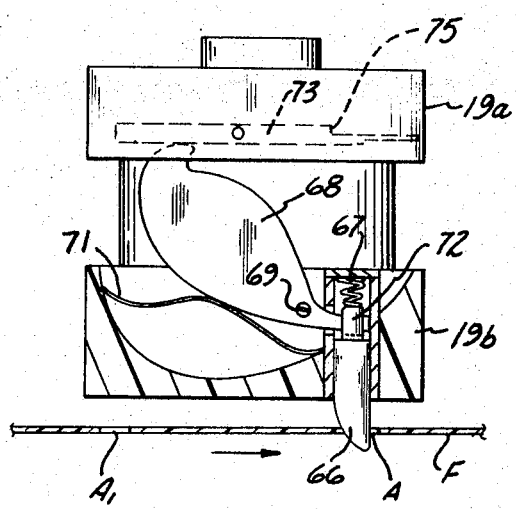
FIG. 18 is a longitudinal sectional view of a further modified form of the invention.
Figure 19:
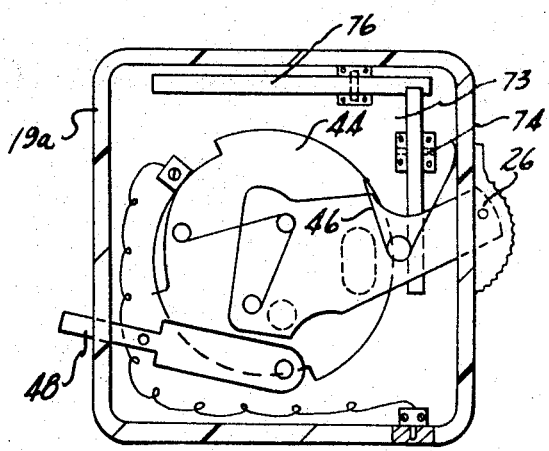
FIG. 19 is a sectional view taken along the line 19—19 in FIG. 18.

It is also desirable to provide means for preventing double exposure while permitting the collapsing relationship of the portions 19a, 19b of the camera. Such a construction is shown in FIGS. 18 and 19 and comprises a spring-loaded plunger 66 which is urged toward the film plane by a spring 67 for engagement with aperture A of the film F. This holds the film in proper relationship longitudinally for exposure. Upon advancement of the film by rotation of the winding knob, the plunger 66 is yieldingly forced outwardly out of the aperture A until the film is wound to a position where the succeeding aperture A' is engaged by the film.

In accordance with the invention, an intermediate level 68 is pivoted at 69 to the body 19b and extends into a groove 70 of the body. A light spring 71 yieldingly urges the lever outwardly so that when the portion 19a of the camera is extended, the lever 68 is also extended. One end of the lever 68 extends to the bifurcated end 72 of the plunger 66 so that when the plunger 66 is moved axially inwardly upon advancement of the film, the lever 68 is momentarily pivoted in a clockwise direction as viewed in 68.

Referring to FIG. 19, a lever 73 is pivoted at 74 about a transverse axis in camera portion 19a and is provided with a notch 75. When the manual shutter actuating lever 26 is actuated, the shutter actuator arm 26 engages the notch 75 holding one end of rocker arm 76 in position. The rocker arm 76 functions thereby to prevent return of the shutter lever 26 to its original position. However, when the film is advanced, the movement of the plunger 66 upwardly as viewed in FIG. 18 permits clockwise movement of the lever 68 releasing rocker arm 76 and permitting the spring 46 to return the lever to its original position.

It is also desirable in the camera, even though it is low cost, to provide for focusing adjustment, and various modifications for achieving a multiposition focusing adjustment are shown in FIGS. 20 – 29.

Figure 20:
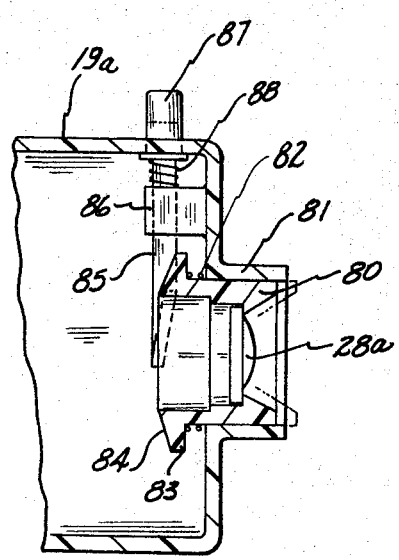
FIG. 20 is a fragmentary longitudinal sectional view of a further modified form of the invention.
Figure 21:
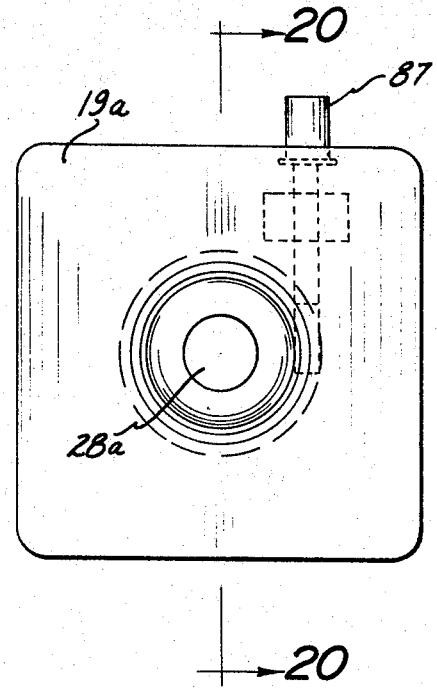
FIG. 21 is an end view of the form of the invention shown in FIG. 20.

In the form of the invention shown in FIGS. 20 and 21, the lens 28a is mounted in a tube 80 that is movable axially in opening 81 on the camera body 19a. A coil spring 82 interposed between a flange 83 and the front wall of portion 19a normally urges the lens toward a rearward position. Flange 83 includes an annular inclined surface 84 that is engaged by a complementary surface on a tangential plunger 85 which is mounted on an integral bracket 86 and extends outwardly to a finger engaging portion 87. A light spring 88 normally urges the plunger radially outwardly. In order to move the lens to a second focusing position, the plunger 87 is depressed causing the interengagement between the plunger 85 and the surface 84 to move the tube axially outwardly bringing the lens 28a to a new focusing position.

Figure 22:
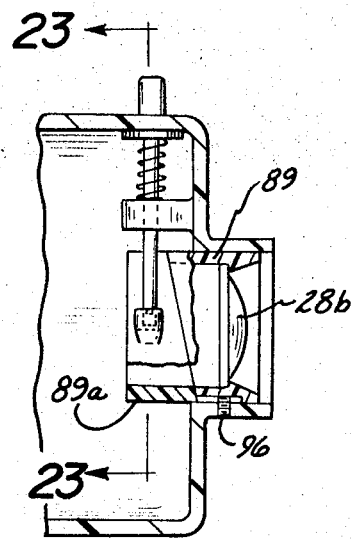
FIG. 22 is a fragmentary longitudinal sectional view through a further modified form of the invention.
Figure 23:
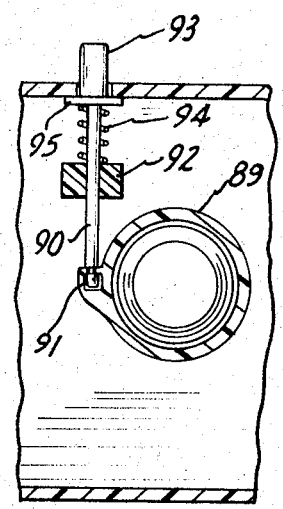
FIG. 23 is a fragmentary sectional view taken along the line 23—in FIG. 22.

In the form of the invention shown in FIGS. 22 and 23, a lens 28b is mounted in a tube 89. A tube section 89a is mounted on tube 89, the tube 89 and section 89a having helical interengaging surfaces. A rod 90 universally interengages a seat 91 on tube section 89a and is guided by a bracket 92 for generally tangential movement with respect to the tube 89. The rod 90 is formed with a finger engaging portion 93 and is yieldingly urged outwardly by spring 94 interposed between bracket 92 and a flange 95. A radial set screw 96 extends into an axial groove 97 in tube 89 to guide the tube 89 for axial movement only. The spring 94 normally urges the rod 90 outwardly and with it the tube 89 to a rotational position corresponding to one focusing position of the lens. When the plunger 90 is depressed, the tube section 89a is rotated and because of the helical engagement causes tube 89 to move axially bringing the lens 28b to a different focusing position.

Figure 24:
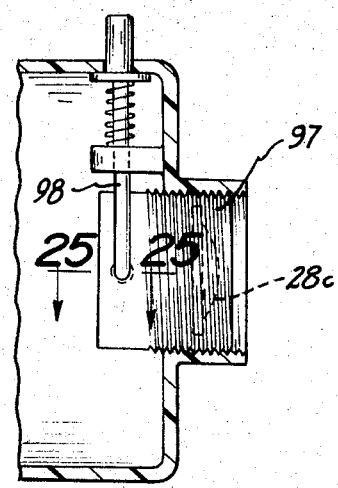
FIG. 24 is a fragmentary longitudinal sectional view through a further modified form of the invention.
Figure 25:
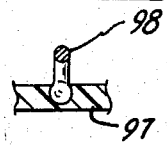
FIG. 25 is a fragmentary sectional view taken along the line 25—25 in FIG. 24.

In the form of the invention shown in FIGS. 24 and 25, the lens 28c is mounted in a tube 97 threaded in the camera body and a rod 98 has one end thereof universally connected to the periphery of the tube. The other end of the rod extends outwardly and is mounted in the same manner as that shown in FIGS. 22 and 23. By depressing the plunger, the tube is caused to rotate relative to the threads on the camera body and thereby move axially outwardly.

Figure 26:
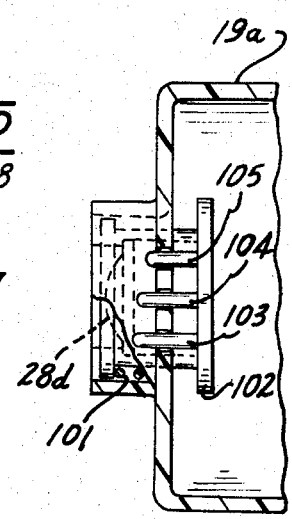
FIG. 26 is a fragmentary longitudinal sectional view of a further modified form of the invention.
Figure 27:
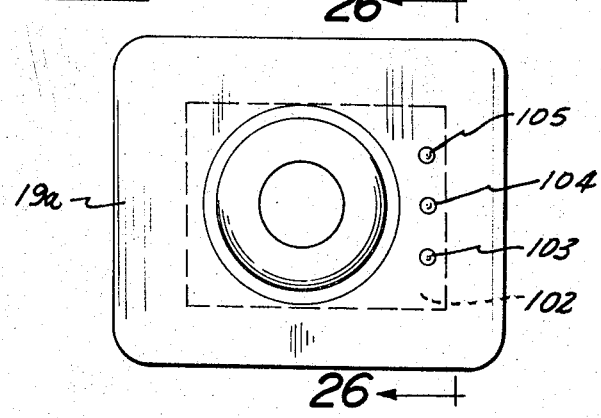
FIG. 27 is an end view of the form of the invention shown in FIG. 26.

In the form of the invention shown in FIGS. 26 and 27, the lens 28d is mounted in a tube 100 that is yieldingly urged outwardly by a spring 101. The tube is provided with a flange 102 that has plungers 103, 104, 105 thereon that project outwardly through openings in the front wall of the body portion 19a of the camera. By selectively engaging one of the plungers 103, 104, 105 and depressing axially inwardly, the tube 100 and, in turn, the lens 28d is moved to differing axial positions corresponding to different focusing positions of the lens. Alternatively, instead of making the plungers 103-105 of differing lengths, flanges may be provided at different longitudinal positions on the plungers for engaging the outer wall of the housing 19a to limit axial positions of the lens.

In the form of the invention shown in FIGS. 28 and 29, the lens 28e is mounted in a tube 106 that is yieldingly urged radially inwardly by a spring 107 interposed between the flange 108 on the body and 109 on the tube. Spaced cams 110, 111 on a shaft 112 that is journalled between the side walls of the camera are adapted to selectively engage a plate 113 on the end of the tube. The position of the cams is controlled by a finger operated rod 114 that engages a lever 115 on shaft 112. A spring 116 normally urges the plunger outwardly to a selected position. By depressing the plunger 114, a different portion of one of the cams is brought into engagement with the plate 113 thereby bringing the lens to a different axial position.

In the form of the invention shown in FIG. 30, the winding knob 33a is mounted on a lever 120 that has a slot 121 thereon through which a mounting pin 122 extends. The lever is in extended operating position for engagement of the knob 33a with the film magazine. In storage position, the lever is moved axially of the slot 120 bringing the knob into engagement with a recess 123 in the body portion 19b.

In the form of the invention shown in FIG. 31, the knob 33b is mounted on a lever 124 that is connected by a hinge 125 to the body 19b. By swinging the lever about the hinge 124, the knob 33b is brought into engagement with a recess 126 in the body for storage purposes.

Figure 32:
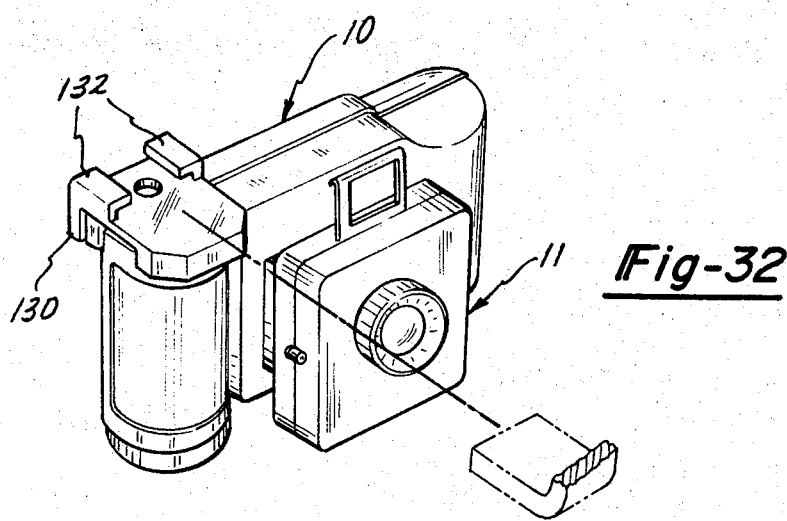
FIG. 32 is a perspective view of a further modified form of the invention.
Figure 33:
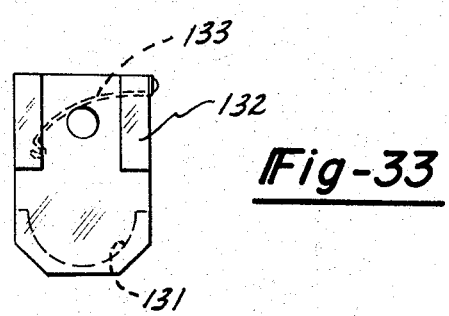
FIG. 33 is a plan view of a portion of the apparatus shown in FIG. 32.
Figure 34:
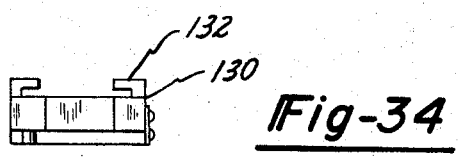
FIG. 34 is an end view of the part of the apparatus shown in FIG. 33.

In the form of the invention shown in FIGS. 32–34, provision is made for mounting of a flash attachment and includes a shoe 130 that has a recess 131 for frictionally engaging the upper portion of the magazine and inwardly extending flanges 132 on which a conventional flash attachment can be mounted. A light spring 133 cooperates with the recess 131 in the film magazine to hold the shoe in position on the film magazine 10.

I claim:
1. The combination comprising
   a factory-loaded film magazine including a supply chamber,
   a take-up chamber having a take-up reel rotatably mounted therein,
   and an intermediate portion comprising spaced front and rear walls through which the film passes from the supply chamber to the take-up chamber,
   said front wall having an aperture therein for exposing a portion of the film,
   and a camera body including a lens,
   a shutter,
   interengaging means between the front wall of said magazine and said camera body to provide a light tight seal,
   and means on said camera body for holding said camera body on said intermediate portion of said magazine, said take-up reel having a portion thereof extending externally of the magazine, a knob having means engaging said last-mentioned portion, and means extending from said camera body for movably supporting and guiding said knob from a retracted position wherein said knob is generally within the peripheral confines of said camera body an extended a position wherein said knob is substantially axially aligned with said portion of said take-up reel for direct engagement with said last-mentioned portion.

2. The combination set forth in claim 1 wherein at least one of said supply chamber and said take-up chamber has a surface adjacent to and extending at an angle to said front wall, said means for holding said camera body on said magazine comprises laterally extending projections on said camera body frictionally engaging said surface.

3. The combination set forth in claim 2 wherein said projections comprise spherical projections.

4. The combination set forth in claim 3 wherein said projections are provided by spherical members embedded in said magazine.

5. The combination set forth in claim 2 wherein said projections are formed by longitudinally extending ribs on said camera body.

6. The combination set forth in claim 5 wherein each said rib has a circular cross section.

7. The combination set forth in claim 5 wherein each said rib has a triangular cross section.

8. The combination set forth in claim 2 wherein said projections comprise longitudinally spaced aligned ribs.

9. The combination set forth in claim 2 wherein said magazine is made of plastic material, said surface of said magazine which is contacted by said projections comprising a generally flat surface, said surface forming a substantially right angle to the plane of said intermediate portion of the magazine.

10. The combination set forth in claim 1 including manually operable means including an actuator for actuating said shutter, means operable upon actuation of said shutter to hold said manually operable actuator in its actuated position, and means operable in response to movement of the film to expose a new portion of the film to permit said last-mentioned means to release the shutter actuator.

11. The combination set forth in claim 10 wherein said camera body comprises two telescoping members comprising inner and outer body members, the outer body member supporting said shutter and said shutter actuator, the inner body member supporting a projecting member movable into and out of apertures of the film, means yieldingly urging said last-mentioned member into engagement with an aperture of the film, means comprising a member pivoted to said outer body member and interconnected with said projecting member and linkage interconnecting said last-mentioned pivoted member with said shutter actuator.

12. The combination set forth in claim 1 including means for supporting said lens for movement of at least two focusing positions, means for yieldingly urging said lens toward one of said positions, and manually operable means for moving said lens to the other of said focusing positions against the action of said yielding means.

13. The combination set forth in claim 12 wherein said last-mentioned means comprises interengaging cam portions between a manually operable lever and the means for supporting the lens.

14. The combination set forth in claim 12 wherein said manually operable means comprises a member movable generally radially inwardly with respect to said lens, said means supporting said lens comprising a tube, said member and said lens having interengaging inclined surfaces whereby radial movement of said member causes axial movement of said tube.

15. The combination set forth in claim 12 wherein said last-mentioned means comprises a member movable generally transversely of said lens, said means for supporting said lens comprises a tube, interengaging means between said member and said tube, and means for guiding said tube for axial movement upon transverse movement of said member.

16. The combination set forth in claim 12 wherein said last-mentioned means comprises a plurality of members of different lengths projecting axially and connected to said lens supporting means whereby upon selective depression of said members, said lenses move to different axial positions.

17. The combination set forth in claim 12 wherein said means for moving said lens comprises a member movable generally transversely of said lens, means operable by said member comprising cams for engaging said lens and moving said lens to different positions.

18. The combination set forth in claim 1 wherein said means for supporting said knob comprises a member movable transversely in the direction of movement of said knob from a storage to an operative position.

19. The combination set forth in claim 18 wherein said means for supporting said lever comprises a slot in said lever and a pin on said cam or body extending through said slot.

20. The combination set forth in claim 1 wherein said means for supporting said knob comprises a hinge means whereby said knob is movable in an arc from a storage to an operative position.

21. The combination set forth in claim 1 including a member removably mounted on said magazine and cooperating with the externally extending portion of said magazine to support said member thereon, said member having a flash attaching means thereon.

22. For use with a factory-loaded film magazine including a supply chamber, a take-up chamber having a take-up reel rotatably mounted therein, and an intermediate portion comprising spaced front and rear walls through which the film passes from the supply chamber to the take-up chamber, said front wall having an aperture therein for exposing a portion of the film, a camera comprising a camera body including a lens, a shutter, interengaging means between the front wall of said magazine and said camera body to provide a light seal, means on said camera body for holding said camera body on said intermediate portion of said magazine, said take-up reel having a portion thereof extending externally of the magazine, a knob having means engaging said last-mentioned portion and means extending from said camera body for movably supporting and guiding said knob from a retracted position wherein said knob is generally within the peripheral confines of said camera body to an extended position wherein said knob is substantially axially aligned with said portion of said take-up reel for direct engagement with said last-mentioned portion.

23. The combination set forth in claim 22 wherein at least one of said supply chamber and said take-chamber has a surface adjacent to and extending at an angle to said front wall,
said means for holding said camera body on said magazine comprises
laterally extending projections on said camera body frictionally engaging said surface of the magazine.

24. The combination set forth in claim 23 wherein said projections comprise spherical projections.

25. The combination set forth in claim 24 wherein said spherical projections are provided by spherical members embedded in said magazine.

26. The combination set forth in claim 23 wherein said projections are formed by longitudinally extending ribs on said camera body.

27. The combination set forth in claim 26 wherein each said rib has a circular cross section.

28. The combination set forth in claim 26 wherein each said rib has a triangular cross section.

29. The combination set forth in claim 23 wherein said projections comprise longitudinally spaced aligned ribs.

30. The combination set forth in claim 22 including manually operable means including an actuator for actuating said shutter,
means operable upon actuation of said shutter to hold said manually operable actuator in its actuated position,
and means operable in response to movement of the film to expose a new portion of the film to permit said last-mentioned means to release the shutter actuator.

31. The combination set forth in claim 30 wherein said camera body comprises two telescoping members comprising inner and outer body members, the outer body member supporting said shutter and said shutter actuator, the inner body member supporting a projecting member movable into and out of apertures of the film, means yieldingly urging said last-mentioned member into engagement with an aperture of the film, means comprising a member pivoted to said outer body member and interconnected with said projecting member and linkage interconnecting said last-mentioned pivoted member with said shutter actuator.

32. The combination set forth in claim 22 including means for supporting said lens for movement to at least two focusing positions,
means for yieldingly urging said lens toward one of said positions,
and manually operable means for moving said lens to the other of said focusing positions against the action of said yielding means.

33. The combination set forth in claim 32 wherein said last-mentioned means comprises interengaging cam portions between a manually operable lever and the means for supporting the lens.

34. The combination set forth in claim 32 wherein said manually operable means comprises a member movable generally radially inwardly with respect to said lens,
said means supporting said lens comprising a tube,
said member and said lens having interengaging inclined surfaces whereby radial movement of said member causes axial movement of said tube.

35. The combination set forth in claim 32 wherein said last-mentioned means comprises a member movable generally transversely of said lens,
said means for supporting said lens comprises a tube,
interengaging means between said member and said tube,
and means for guiding said tube for axial movement upon transverse movement of said member.

36. The combination set forth in claim 32 wherein said last-mentioned means comprises a plurality of members of different lengths projecting axially and connected to said lens supporting means whereby upon selective depression of said members, said lenses move to different axial positions.

37. The combination set forth in claim 32 wherein said means for moving said lens comprises a member movable generally transversely of said lens,
means operable by said member comprising cams for engaging said lens and moving said lens to different positions.

38. The combination set forth in claim 22 including means extending from said camera body for movably supporting and guiding said knob on said camera body for movement between a position wherein said knob is generally within the peripheral confines of said camera body to a position wherein said knob is substantially axially aligned with said portion of said take-up reel for direct engagement with said last-mentioned portion, said means for supporting said knob comprising a member movable transversely in the direction of movement of said knob from a storage to an operative position.

39. The combination set forth in claim 38 wherein said means for supporting said lever comprises a slot in said lever and a pin on said cam or body extending through said slot.

40. The combination set forth in claim 22 including means extending from said camera body for movably supporting and guiding said knob on said camera body for movement between a position wherein said knob is generally within the peripheral confines of said camera body to a position wherein said knob is substantially axially aligned with said portion of said take-up reel for direct engagement with said last-mentioned portion, said means for supporting said knob comprising a hinge means whereby said knob is movable in an arc from a storage to an operative position.

41. The combination set forth in claim 22 including a member removably mounted on said magazine and cooperating with the externally extending portion of said magazine to support said member thereon,
said member having a flash attaching means thereon.

42. The combination comprising
a factory-loaded film magazine including a supply chamber,
a take-up chamber having a take-up reel rotatably mounted therein, and an intermediate portion comprising spaced front and rear walls through which the film passes from the supply chamber to the take-up chamber, said front wall having an aperture therein for exposing a portion of the film, and a camera body including a lens, a shutter, interengaging means between the front wall of said magazine and said camera body to provide a light tight seal, at least one of said supply chamber and said take-up chamber having a surface adjacent to and extending at an angle to said front wall, said camera body having laterally extending projections thereon frictionally engaging said surface for holding said camera body on said magazine.

43. The combination set forth in claim 43 wherein said magazine is made of plastic material, said surface of said magazine which is contacted by said projections comprising a generally flat surface, said surface forming a substantially right angle to the plane of said intermediate portion of the magazine.

44. For use with a factory-loaded film magazine including a supply chamber, a take-up chamber having a take-up reel rotatably mounted therein, and an intermediate portion comprising spaced front and rear walls through which the film passes from the supply chamber to the take-up chamber, said front wall having an aperture therein for exposing a portion of the film, at least one of said supply chamber and said take-up chamber having a surface adjacent to and extending at an angle to said front wall, a camera comprising a camera body including a lens, a shutter, interengaging means between the front wall of said magazine and said camera body to provide a light seal, said camera body having laterally extending projections thereon adapted to frictionally engage said surface on the magazine for holding said camera body on said magazine.

* * * * *